United States Patent
Rune et al.

(10) Patent No.: US 10,623,971 B2
(45) Date of Patent: Apr. 14, 2020

(54) SPATIAL SEPARATION AS BEAM REPORTING CONDITION

(71) Applicant: Telefonaktiebolaget LM Ericsson (publ), Stockholm (SE)

(72) Inventors: Johan Rune, Lidingö (SE); Johan Axnäs, Solna (SE); Andres Reial, Malmö (SE); Henrik Sahlin, Mölnlycke (SE); Icaro L. J. Da Silva, Bromma (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 146 days.

(21) Appl. No.: 15/128,236

(22) PCT Filed: Jun. 15, 2016

(86) PCT No.: PCT/SE2016/050576
§ 371 (c)(1),
(2) Date: Sep. 22, 2016

(87) PCT Pub. No.: WO2017/217898
PCT Pub. Date: Dec. 21, 2017

(65) Prior Publication Data
US 2018/0176801 A1 Jun. 21, 2018

(51) Int. Cl.
*H04B 7/00* (2006.01)
*H04W 24/08* (2009.01)
(Continued)

(52) U.S. Cl.
CPC .......... *H04W 24/08* (2013.01); *H04B 7/0617* (2013.01); *H04B 7/0632* (2013.01);
(Continued)

(58) Field of Classification Search
CPC .. H04W 92/10; H04W 76/025; H04W 76/027
(Continued)

(56) References Cited

U.S. PATENT DOCUMENTS 8,508,409 B2 * 8/2013 Hosoya .................... G01S 3/74
342/373
8,660,598 B2 * 2/2014 Prasad ................. H04B 7/0695
455/504
(Continued)

FOREIGN PATENT DOCUMENTS

WO WO 2016/179804 A1 11/2016

OTHER PUBLICATIONS

Notification of Transmittal of the International Search Report and the Written Opinion of the International Searching Authority, or the Declaration for International Application No. PCT/SE2016/050576, 16 pages (dated Feb. 16, 2017).

*Primary Examiner* — Dmitry Levitan
(74) *Attorney, Agent, or Firm* — Patent Portfolio Builders, PLLC

(57) ABSTRACT

The disclosure relates to methods, devices, and computer programs in mobile communications. More specifically, the proposed technique relates to facilitating communication between a network node and a wireless device. In particular the disclosure relates to introducing spatial separation as a beam reporting condition in order to mitigate the effects of link failure. The disclosure proposes a method for use in a wireless device, for facilitating communication with a network node. The method comprises performing measurements relating to channel quality and spatial separation of a plurality of candidate downlink beams, determining, based on the performed measurements, a set of downlink beams, such that each beam in the set of beams satisfies a channel quality criterion and a spatial separation criterion, and reporting information defining the determined set of downlink beams to a network node.

23 Claims, 6 Drawing Sheets

(51) Int. Cl.
*H04B 7/06* (2006.01)
*H04W 72/04* (2009.01)
*H04B 7/0413* (2017.01)

(52) U.S. Cl.
CPC ........ *H04B 7/0695* (2013.01); *H04W 72/046* (2013.01); *H04B 7/0413* (2013.01)

(58) Field of Classification Search
USPC ........ 370/310, 328, 339, 465; 455/125, 129, 455/334
See application file for complete search history.

(56) References Cited

U.S. PATENT DOCUMENTS

| | | | |
|---|---|---|---|
| 9,668,189 B2* | 5/2017 | Wang | H04W 36/245 |
| 2011/0110453 A1 | 5/2011 | Prasad et al. | |
| 2012/0119953 A1 | 5/2012 | Hosoya et al. | |
| 2014/0295842 A1* | 10/2014 | Choi | H04B 7/0408 |
| | | | 455/436 |
| 2015/0189568 A1* | 7/2015 | Stanze | H04B 7/0417 |
| | | | 370/331 |
| 2015/0341105 A1 | 11/2015 | Yu et al. | |
| 2016/0150435 A1* | 5/2016 | Baek | H04W 16/28 |
| | | | 370/252 |
| 2017/0156097 A1* | 6/2017 | Weber | H04W 36/30 |
| 2017/0164248 A1* | 6/2017 | Weber | H04W 36/0072 |

* cited by examiner

SPATIAL SEPARATION AS BEAM REPORTING CONDITION

CROSS REFERENCE TO RELATED APPLICATION

This application is a 35 U.S.C. § 371 national stage application of PCT International Application No. PCT/SE2016/050576, filed on Jun. 15, 2016, the disclosure and content of which is incorporated by reference herein in its entirety.

TECHNICAL FIELD

The disclosure relates to methods, devices, and computer programs in mobile communications. More specifically, the proposed technique relates to facilitating communication between a network node and a wireless device. In particular the disclosure relates to introducing spatial separation as a beam reporting condition in order to mitigate the effects of link failure.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD, and Time Division Duplex, TDD, modes.

In a UTRAN and an E-UTRAN, a User Equipment, UE, i.e. a wireless device, is wirelessly connected to a Radio Base Station, RBS, commonly referred to as a NodeB, NB, in UMTS, and as an evolved NodeB, eNodeB or eNB, in LTE. A Radio Base Station, RBS, or an access point is a general term for a radio network node capable of transmitting radio signals to a UE and receiving signals transmitted by a UE. In Wireless Local Area Network, WLAN, systems the wireless device is also denoted as a Station, STA.

In the future communication networks, also referred to as the 5th generation mobile networks, there will be evolvement of the current LTE system to the so called 5G system. Due to the scarcity of available spectrum for future mobile, wireless communication systems, spectrum located in very high frequency ranges (compared to the frequencies that have so far been used for wireless communication), such as 10 GHz and above, are planned to be utilized for future mobile communication systems.

For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is frequency dependent, i.e., the link budget would be worse for the same link distance even in a free space scenario, if omnidirectional receive and transmit antennas are used. This motivates the usage of beamforming to compensate for the loss of link budget in high frequency spectrum.

Hence, future communications networks are expected to use advanced antenna systems to a large extent. With such antennas, signals will be transmitted in narrow transmission beams to increase signal strength in some directions, and/or to reduce interference in other directions. The beamforming will enable high data rate transmission coverage also to very distant users which would not realistically be covered with normal sector-wide beams, which have lower antenna gain. Beamforming may be used at the transmitter, at the receiver, or both. In a large part of the spectrum planned for 5G deployments the preferred configuration is to use a large antenna array at the access node and a small number of antennas at the wireless device. The large antenna array at the access node enables high-order transmission beamforming in the downlink.

The high frequencies and reliance of beamforming makes it challenging to maintain a reliable radio link. A narrow beam can quickly be lost—in particular when combined with poor refraction properties. Hence, beamforming based high-frequency radio access technologies are more susceptible to sudden changes in link quality or even loss of coverage, which may lead to significant delays and signalling until the wireless device can recover and find coverage again.

SUMMARY

An object of the present disclosure is to provide methods and devices configured to execute methods and computer programs which seek to mitigate, alleviate, or eliminate one or more of the above-identified deficiencies in the art and disadvantages singly or in any combination.

This disclosure proposes a method to configure wireless devices to identify and report spatially and/or angularly separated downlink beams during a measurement procedure in a beam-based high frequency wireless communication system.

This object is achieved by a method for use in a wireless device, for facilitating communication with a network node. The method comprises performing measurements relating to channel quality and spatial separation of a plurality of candidate downlink beams, determining, based on the performed measurements, a set of downlink beams, such that each beam in the set of beams satisfies a channel quality criterion and a spatial separation criterion, and reporting information defining the determined set of downlink beams to a network node. By providing information about spatially separated beams, the proposed method enables various ways of providing and configuring back-up beams for a wireless device, e.g. in conjunction with handover, but also, if desired, during continuous operation, in order to ensure more reliable connectivity for the wireless device.

According to some aspects, the method comprises obtaining the spatial separation criterion and/or the channel quality criterion. By obtaining spatially separated beams, the back-up beams may be selected such that the back-up beam is a good alternative when an obstacle prevents transmission from the presently serving beam.

According to some aspects, the determining comprises identifying a first beam, wherein the first beam is a by the wireless device preferred serving beam for communication with the network node, and wherein the first beam is included in the determined set of downlink beams. According to some aspects, the determining comprises identifying at least one second beam, such that the at least one second beam fulfils at least one spatial separation criterion with regards to the first beam or with regards to a currently used serving beam, and wherein the second beam is included in the determined set of downlink beams. The proposed solution of selecting a second beam increases the reliability of beam-based high frequency wireless communication systems and alleviates the above described problem of sudden and/or frequent radio link loss by enabling efficient identification, selection and configuration of back-up beams to be used to maintain connectivity in the presence of beam loss/failure.

The proposed methods also enable efficient mobility measurement reporting that allows reliable back-up beam selection without significantly increasing the uplink signaling load.

According to some aspects, the second beam may be used as a back-up beam of the first beam being or of a currently used serving beam. According to some aspects, the reporting comprises reporting information defining the first beam and/or the at least one second beam. Determining the first and second beams in the wireless device is efficient in many situations, as all information required is already available in the wireless device.

According to some aspects, the determining comprises determining the set of downlink beams by evaluating an estimated direction of arrival of the plurality of candidate downlink beams. Direction of Arrival, DoA, is a measure that relatively easily can be estimated using modern MIMO solutions. Hence, it is suitable for estimation of spatial separation.

According to some aspects, the disclosure relates to a method for use in a network node, for facilitating communication with a wireless device, wherein the network node is communicating with the wireless device using a first beam. The method comprises obtaining information defining at least one second beam that satisfies a channel quality criterion and a spatial separation criterion with regard to the first beam, and initiating activation of at least one of the second beams. By configuring a second beam, the activation of the second beam can be performed directly when the first link fails, or it can be activated in advance.

According to some aspects, the disclosure relates to a corresponding wireless device being configured for facilitating communication with a network node. The wireless device comprises radio communication interface and processing circuitry. The processing circuitry is configured to cause the wireless device to perform measurements relating to channel quality and spatial separation of a plurality of candidate downlink beams, to determine, based on the performed measurements, a set of downlink beams, such that each beam in the set of beams satisfies a channel quality criterion and a spatial separation criterion, and to report information defining the determined set of downlink beams to a network node.

According to some aspects, the disclosure relates to a corresponding network node in a cellular communication network configured for facilitating communication with a wireless device, wherein the network node is communicating with the wireless device using a first beam. The network node comprises a communication interface and processing circuitry configured to cause the network node to obtain information defining at least one second beam that satisfies a channel quality criterion and a spatial separation criterion with regards to the first beam, and to initiate activation of at least one of the second beams.

According to some aspects, the disclosure relates to computer program comprising computer program code which, when executed, causes a network node to execute the methods described above and below.

According to some aspects, the disclosure relates to computer program comprising computer program code which, when executed, causes a wireless device to execute the methods described above and below.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
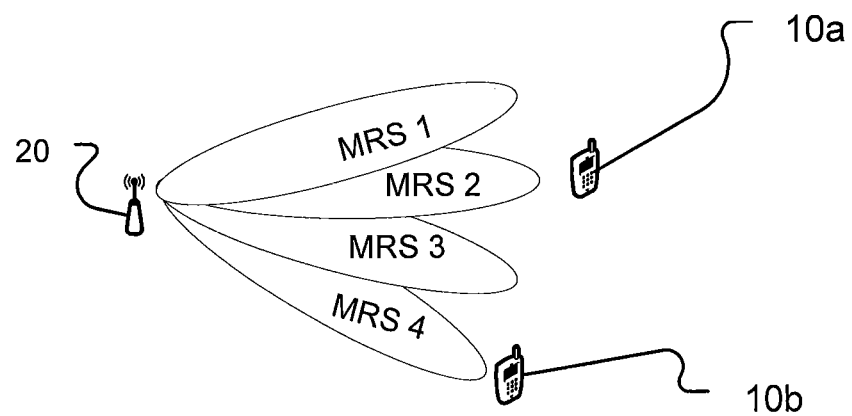
FIG. 1 illustrates a beam sweep transmitted from one access point.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

As discussed in the background, future systems are expected to make heavy use of high-gain narrow beamforming, which makes it challenging to maintain a reliable radio link. An example of a network node 20 transmitting several directed beams 1, 2, 3, 4 in a beam sweep and two receiving wireless devices 10a, 10b is illustrated in FIG. 1.

Wireless device mobility, appearance of obstacles, e.g. the user's head, and even mere rotation of the wireless device may prevent the transmissions from reaching the receiver with high enough Signal to Interference and Noise Ratio, SINR. A reduction in SINR may lead to a high reduction of data rates or even a declaration of radio link failure by the higher layers which may lead to significant delays and signalling until the wireless device can recover and find coverage again.

To address this problem the disclosure presents an approach to identify suitable downlink back-up beams, which can be used to ensure acceptable connectivity continuity in case a certain beam, e.g. the serving beam or the beam initially believed to be the best, fails.

The disclosure proposes that back-up beams are selected in a way that makes it likely that the back-up beam is still available, and can maintain the wireless device's connectivity, when a higher ranked beam (e.g. the serving beam) fails. Hence, beam failure probability of the back-up beam should not be correlated with the failure probability of the first choice beam and preferably not correlated with the failure probability of possible other back-up beams either.

More specifically, the disclosure proposes a solution where back-up beams that are significantly spatially separated at the wireless device, are identified e.g. during a downlink beam sweep measurement procedure. In general, it is critical that the back-up beams are beams being spatially separated by their direction of arrival at the receiver. Such a spatial separation will in many cases be achieved by using spatially separated transmission points. However, transmission separation is not guaranteed for spatial separation, e.g. there may be propagations scenarios where significant transmission separation results in negligible difference in direction of arrival in one receiver.

For better understanding of the proposed technique a short introduction to beam sweeping procedures foreseen to be used in the next generation communication systems will now be given In order for the initial-access procedure not to be the coverage-limiting factor in such systems, the synchronization signal will typically also have to use high-gain narrow beams. This means that the access node will typically have to transmit the synchronization signal multiple times, in different directions, to cover the geographical area to be served by an access node, access node. With typical antenna configurations envisioned for the next generation communication systems, sometimes referred to as 5G systems, a narrow beam may cover only a small fraction of the entire geographical area (e.g. 1%) at a time, and consequently it may take substantial time to transmit the beam in all directions needed, one or a few directions at a time.

The access node could in principle, depending on hardware configuration, transmit the synchronization signal in many directions at the same time, but given a maximum total output power of the access node, such simultaneous transmission would be at the expense of proportionally reduced power per beam, i.e. effectively reduce the coverage. This could be compensated for by over-dimensioning the hardware such that excessive total output power is available, but this would undesirably increase the cost of the equipment. The procedure of sequentially transmitting the beam in all necessary directions is referred to as a beam sweep or beam scan. "Necessary directions" here means all directions where coverage is desired. FIG. 1 illustrates a beam sweep transmitted from a network node 20 having one transmission point. However, in the 5G systems it is also expected that one access point might have several transmission points.

Such a beam sweeping procedure with the purpose of synchronization and beam finding may be performed both for initial access (as described above) and in conjunction with handover of a wireless device from one beam to another. Note that a handover preparation procedure involving beam sweeping may involve activated candidate target beams from the wireless device's current serving access node and/or one or more other candidate target access nodes. In 5G systems it is also expected that one single access node might have several transmission points.

The wireless device may hear any of the many transmissions of the synchronization signal during the beam sweep, and the network will not know which one the wireless device heard. This means that if the wireless device is supposed to send a system access request, e.g. using PRACH, a certain time after hearing a synchronization beam transmission, which is a typical random access request procedure, then the network has to listen for a UL signal at multiple time instances in a given direction, and/or the wireless device has to transmit its UL signal at multiple time instances. Also, it means that the wireless device has to listen for any additional information necessary to access the system, e.g. system information, at multiple time instances and/or the network has to transmit additional information at multiple time instances. All the mentioned cases lead to inefficient use of radio resources. In particular, this is the case since a node may at any one time typically only listen to a limited number of signals, and in half-duplex TDD systems (a typical choice for future wireless communication systems) the node cannot transmit any signals at all while listening.

The beam sweep may serve other purposes than just time and frequency synchronization; in particular, the sweep may also serve the purpose of determining the best beam direction for data transmission to the new wireless device. In such cases, the beam may contain some information that uniquely identifies the synchronization beam, so that the wireless device can report to the access node, which beam that was best received. Here, the best beam can be characterized by several alternative measures, for example the one received with highest power, largest signal to noise ratio, smallest time of arrival (indicating closest access node) or first received power over a threshold. This can be seen as a sort of spatial synchronization. For simplicity, we will henceforth collectively refer to signals for time and frequency synchronization as well as beam identification as just synchronization signals, which comprise synchronization sequences.

Figure 2:
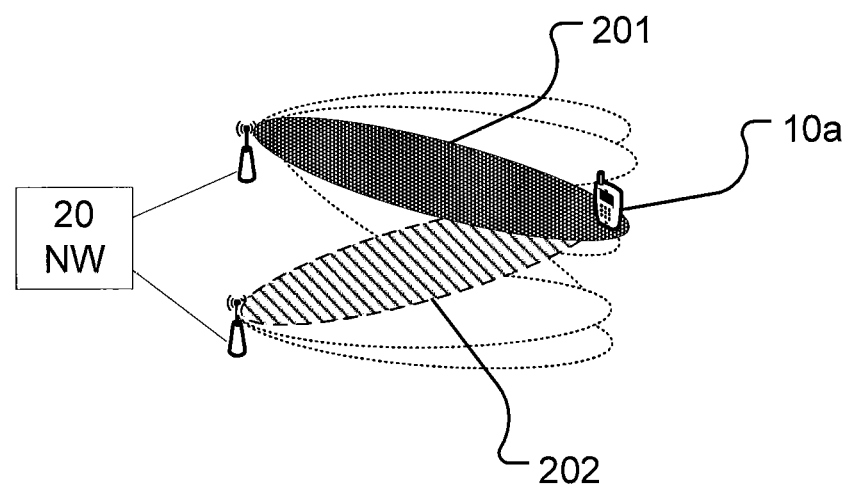
FIG. 2 illustrates a serving beam and a back-up beam being spatially separated.

In the present disclosure, the beam sweep not only serves the purpose of determining the preferred (best) beam direction, but it may also serve the purpose of determining suitable back-up beams as discussed above. Suitable within this context implies having a significant spatial separation, such that e.g. physical obstacles that may prevent the transmissions from reaching the receiver in one beam direction are not preventing the transmission from the back-up direction. This is illustrated in FIG. 2, where two spatially separated beams 201 and 202, transmitted from different transmission points, are suitable back-up beams. Spatial separation is e.g. estimated in terms of the Direction of Arrival, DoA, at the wireless device.

To enable such measurements and efficient measurement reporting by the wireless device, the solution proposes a method executed by the network node and a wireless device for facilitating communication without substantial interruptions, by enabling configuration of one or more back-up beams of a serving beam. If the back-up beam is kept active, then the communication could actually be without interruption (but a consequence may instead be e.g. that the total bitrate is reduced). Then the back-up beam is not really a back-up beam, but "dual connectivity" or "multi-connectivity" are more appropriate terms. In case of two beams providing connectivity in parallel, these beams could either have equivalent status or one could be considered the primary beam and the other could be considered the secondary (where the significance of "primary" vs. "secondary" could e.g. be differences in how or what control signaling that is conveyed through the beam). However, the proposed methods could also be used for determining appropriate beams in these situations. Hence, such parallel operation of two or more beams is one possible way of using a back-up beam.

Depending on the requirements of the wireless device or an application running on the wireless device, it is proposed that back-up beams are provided as standby resources ready to be activated, active in parallel with a serving beam, or active with the serving beam and the back-up beam used as a set of beams together providing the connectivity to the wireless device. Activated in parallel refers to the case where a back-up beam is activated (e.g. in terms established and known configuration parameters and possibly even with radio resources reserved), but the back-up beam is not used for active communication, see below.

In the latter case, where both the serving beam and the back-up beam are "really" active, the notion of serving beam and back-up beam in a sense loses its meaning as the two beams are both serving the wireless device together and provide redundancy, i.e. back-up support, for each other in case of failure.

The proposed back-up beams can be used in various ways to increase both reliability and performance. To this end, back-up beams may be used in different ways depending on the requirements of the wireless device or an application running on the wireless device. In other words, back-up beams may be triggered at different layers (e.g. layer 1 or 3), activated at different time scales (e.g. as soon as possible to save the link or when convenient to the network) and they may have different separation criteria such as minimal direction of arrival difference or "must be a different transmission point" etc. This will be further described below.

One possible way to implement the proposed technique is that the wireless device reports the best received downlink beam and in addition the strongest (or best quality) downlink beam. This variation of the proposed technique is referred to as the wireless device assisted aspect.

The wireless device may be configured to report even more additional downlink beams with suitable spatial/angular separation, e.g. the strongest (or best quality) beam whose direction of arrival differs more than a certain angle α, from the best beam or the strongest (or best quality) beam whose direction differs more than α from the two first reported beams. Similar angular conditions may be used to configure potential reporting of further beams, in principle an arbitrary number.

The directional condition for the reporting of the additional downlink beams (i.e. potential back-up beams) is according to some aspects complemented with one or more channel quality condition(s), e.g. that a beam should be reported only if its channel quality (e.g. in terms of RSRP, SINR, SNR) is above a certain threshold. The threshold may be absolute, e.g. minimal required signal quality, or relative, e.g. compared to the quality of the best beam or a beam currently serving the wireless device.

An alternative way to implement the proposed technique is a "more network centric" reporting configuration, which potentially would increase the chances of identifying as many as possible well enough spatially separated beams with good enough channel quality.

According to this aspect, the wireless device would be configured to identify all beams with a channel quality above a certain threshold, and select the biggest possible set out of these beams, which also satisfy a spatial separation condition, e.g. in terms of a minimum angle difference to all other beams in the set. An additional condition could be that the best beam should be included in the selected set of beams or that if the beam set selection algorithm results in a set of beams which excludes the best beam, then the best beam should be reported to the network in addition to the selected set of beams.

This aspect would provide a greater number of suitable back-up beams since a beam may be included in the set which would have been overlooked with the above described step-wise sequential selection of the best beam that is well enough spatially separated from the already selected ones. A third alternative would be a (completely) network centric aspect, where the wireless device simply reports all data required to determine suitable back-up beams, and wherein the back-up beams are identified in the network.

Example Operations

The proposed methods will now be described in more detail referring to FIG. 3 and FIG. 4. It should be appreciated that FIG. 3 and FIG. 4 comprise some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order. Furthermore, it should be appreciated that not all of the operations need to be performed. The example operations may be performed in any order and in any combination.

Figure 3:
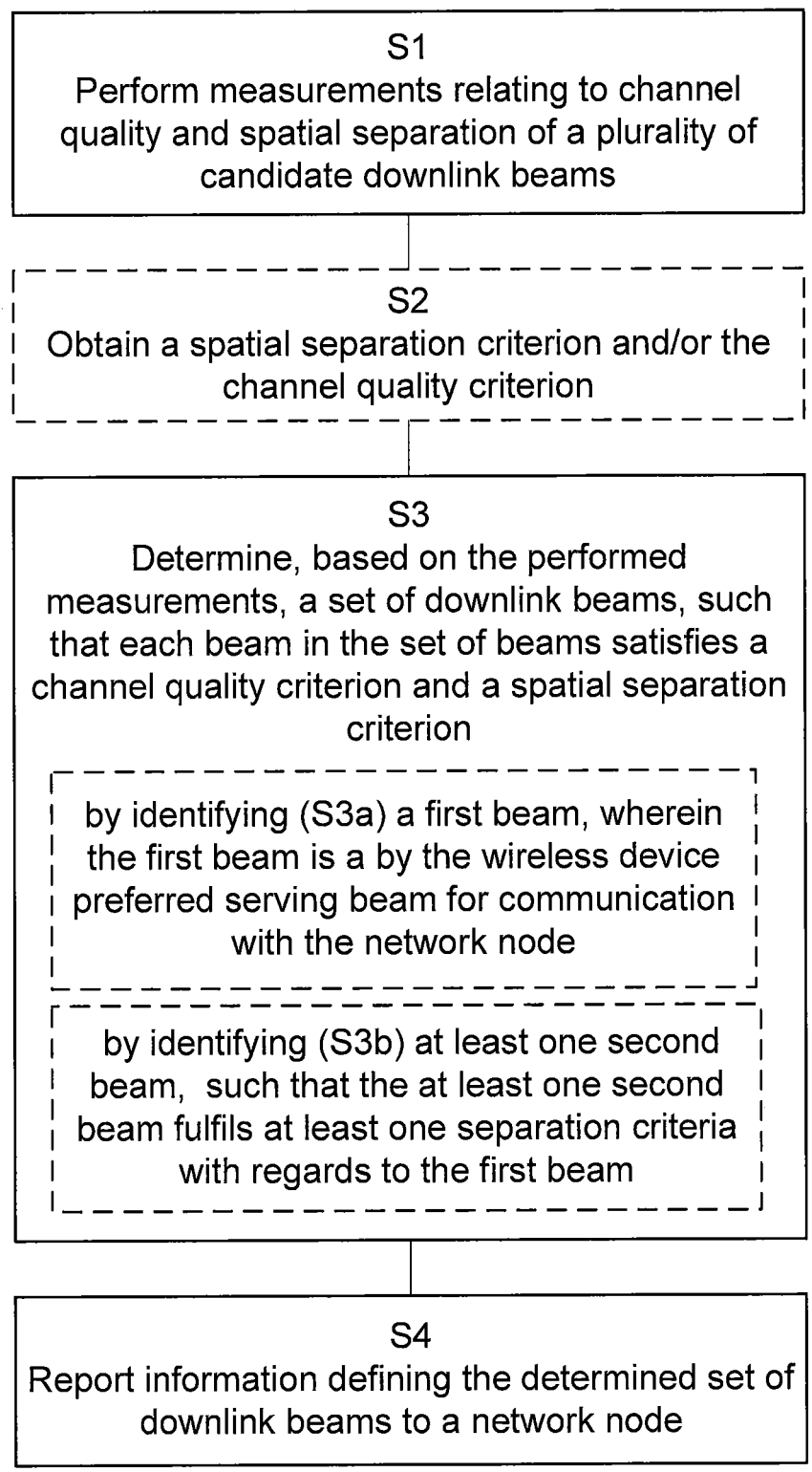
FIG. 3 is a flow chart that illustrates the method steps performed in a wireless device according to some aspects of the present disclosure.
Figure 4:
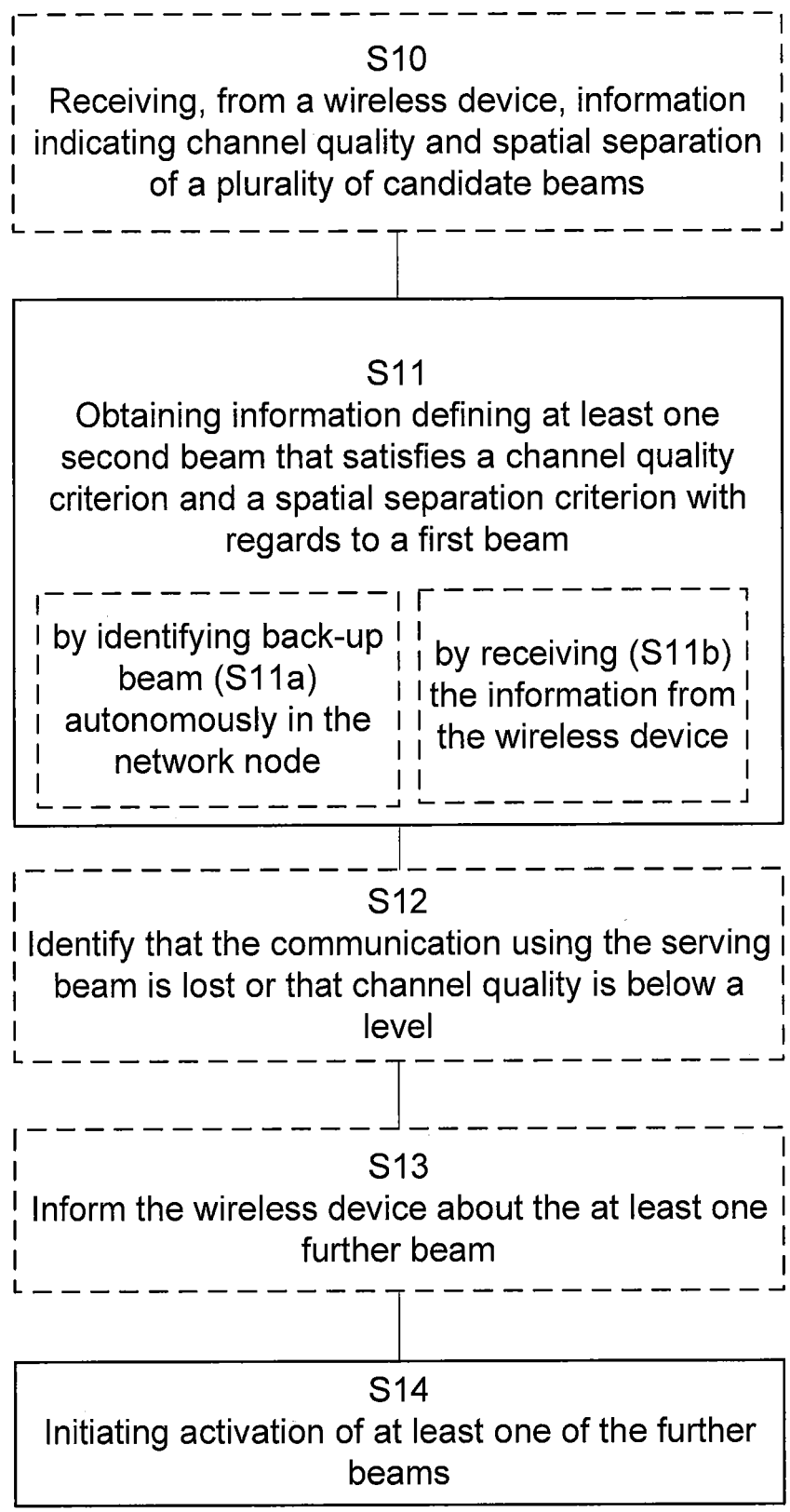
FIG. 4 is a flow chart that illustrates the method steps performed in a network node according to some aspects of the present disclosure.

FIG. 3 illustrates a method for use in a wireless device, for facilitating communication with a network node. The method being performed by a wireless device 10a in a wireless communication network such as the system of FIG. 2. The method could be performed any time e.g. when the wireless device is connected to a network node via a serving beam or at connection setup or at handover preparations.

Determining downlink beams that are suitable to serve a wireless device and evaluating respective channel quality, are tasks most suitably performed by the wireless device. Beam identification procedures in general are used e.g. in conjunction with wireless device mobility, i.e. handover between beams. According to a typical such procedure, the network (e.g. the serving access node or a controlling entity such as a cluster head or a Master eNodeB) configures the wireless device with a number of beams (in terms of beam reference signals, e.g. Mobility Reference Signals, MRSs) to search for. The network then more or less sequentially transmits these beams, in a so-called beam sweep, for the wireless device to measure on. Hence, to utilize such a beam sweep and measurement procedure to identify suitable, spatially separated back-up beams, methods are needed for configuring the wireless device's measurement reporting accordingly, so that the network can be informed of how the wireless device perceives the beams in the sweep, e.g. in terms of channel quality and direction.

As discussed above, the purpose of the methods is to identify suitable back-up beams which can ensure acceptable connectivity continuity in case a certain beam or sometimes several beams (e.g. the serving beam(s) or the beam(s) that initially was assessed to be the best) fails. Backup beams are advantageous in many situations in a high frequency beam based wireless communication network. They can be used in various ways to increase both reliability and performance.

The method comprises performing S1 measurements relating to channel quality and spatial separation of a plurality of candidate downlink beams. In other words, a wireless device performs measurements on a number of candidate beams, i.e. beams that are potential serving and/or back-up beams.

The measurements are related to channel quality of the candidate beams, which implies that channel quality can be estimated based on the measurements. Examples of channel quality measures are Signal to Noise Ratio and Signal to Noise and Interference Ratio.

The measurements are also related to spatial separation of the candidate beams, which implies that spatial separation, can be estimated based on the measurements. Spatial separation is typically Direction of Arrival, DoA, or Angle of Arrival, AoA, which can be estimated by using multiple antennas in the wireless device to receive a beam. In all foreseeable implementations, either known reference signals are transmitted in the beam, or a transmitted signature sequence is detected by the wireless device and can thereafter be used as known reference signal. For each receiver antenna element, a channel estimate may then be computed based on the reference signal. The set of channel estimates over multiple elements can then be used for DoA estimation.

In some example implementations, especially at higher frequency bands, wireless devices employ regular linear or planar antenna arrays. Peak-detecting the Fast Fourier Transform, FFT, of the element-domain estimates may be used to extract the dominant arrival direction of the beam. The peak location in the FFT is then mapped to a physical direction, using the known element spacing.

In some example implementations, the wireless device antenna array may have an irregular structure, with non-uniform element spacing and element directivity, and scattering near the array. In these configurations, the classical FFT techniques may not provide easily interpretable results. However, selected subsets of antenna elements, e.g. pairs or small groups of individual elements with similar directivity, can nevertheless be used for relative DoA estimation using classical phased array delay/angle relationships. An overall DoA difference metric for two beams may then be created by combining the per-subset metric differences.

Regardless of how the back-up beams are used, one enabler for the proposed technique is finding a means to identify the suitable back-up beam(s). A back-up beam should be selected in a way that makes it likely that the back-up beam is still available, and can maintain the wireless device's connectivity, when a higher ranked beam (e.g. the serving beam) fails. As discussed above spatial separation is a key parameter in order to achieve this. Beams fulfilling a certain spatial separation criterion and or a channel quality criterion are typically suitable back-up beams. In other words, spatially separated substitutable or interchangeable beams are suitable as back-up beams. For example, a difference in direction of arrival between the serving beam and a back-up beam is 40 degrees or more and the channel quality is above a threshold. The separation criterion may be received from the network e.g. at connection setup or hardcoded in the wireless device. Hence, according to some aspects, the method comprises obtaining S2 a spatial separation criterion and/or a channel quality criterion. According to some aspects it is several criteria.

The method further comprises evaluating different candidate beams with regards to the channel quality and/or spatial separation criterion in order to find a set of suitable back-up beams. Stated differently, the method further comprises determining S3, based on the performed measurements, a set of downlink beams, such that each beam in the set of beams satisfies a channel quality criterion and a spatial separation criterion. In other words the wireless device determines a set of potential back-up beams. A set comprises at least one beam, typically at least one back-up beam. According to some aspects, the set comprises only one beam. The set of beams are typically determined such that if one beam fails, the probability that the other beams also fails is minimized. Stated differently, the proposed solution is to identify and select beams that are significantly spatially separated, e.g. in terms of directions as seen from the wireless device. This means that each beam in the set of downlink beams has a certain spatial separation with regards to any other beam in the set. Physically, this often means that the different beams should originate from different access nodes and/or utilize different physical propagation paths, e.g. reflections from different objects. Naturally, a beam also has to be able to provide a certain (e.g. minimum) channel quality to be selected as a potential back-up beam. According to some aspects the channel quality criterion depends on (or is interrelated with) the spatial separation. For example, a beam that is 30 degrees from the best beam might be included only if it has at least 75% of the received power of the best beam, whereas a beam that is 60 degrees from the best beam might be included as long as it is above some low absolute threshold.

According to some aspects, the determining S3 comprises evaluating an estimated direction of arrival of the plurality of candidate downlink beams. For example, the determining comprises determining the set of back-up beams such that the difference in direction of arrival of the beams in the set (with regards to any other beam in the set) is more than a certain angle $\alpha$, e.g. $\alpha=45°$, alternatively more than a certain angle from the best beam, or the current serving beam or preferred serving beam. Typically the best beam according to the measurements is a good reference for the evaluation. But in the cases where the wireless device is not handed over, but beams are added for multi-connectivity or just being identified as back-up beams (e.g. to be available standby), then it could be relevant to use the direction of the current serving beam as the reference.

As discussed above different implementations are possible. The method may be more or less network centric or wireless device assisted in terms that more or less calculations are performed in the wireless device. If the method is performed at setup or handover, the determining might involve that the wireless device determines a preferred serving beam and a set of possible back-up beams and reports those to the network. The network may then, while also taking other parameters into account, determine (allocate) a serving beam and one or more back-up beam. Stated differently, according to some aspects, the determining S3 comprises identifying S3a a first beam, wherein the first beam is a by the wireless device preferred serving beam for communication with the network node, and wherein the first beam is included in the determined set of downlink beams.

According to some aspects, the determining S3 comprises identifying S3b at least one second beam, such that the at least one second beam fulfils at least one spatial separation criterion with regards to the first beam or with regards to a currently used serving beam, and wherein the second beam is included in the determined set of downlink beams. In other words, the wireless device determines a suitable back-up beam of the presently used beam or of a preferred "best" beam.

Sometimes the wireless device is already connected to the network using a serving beam, here referred to as the currently (or presently) used serving beam. The determined set of beams then comprises possible back-up beams of the present serving beam. According to some aspects, the second beam may be used as a back-up beam of the first beam or of a currently used serving beam or of a target beam in a handover situation. One possible scenario is that the wireless device reports a set of beams fulfilling the spatial separation criterion, without indicating any priority within the set. The network might then select a serving beam (or several serving beams) and one or more back-up beams from this set.

Hence, the wireless device identifies suitable back-up beam(s), in accordance with the spatial separation criterion defined above, and reports to the network. The receiving network node is e.g. an access node or another controlling entity, where the identified suitable back-up beam(s) is/are recorded in the network. Stated differently, the method further comprises reporting S4 information defining the determined set of downlink beams to a network node. Defining implies that it is possible to identify the beams based on the information. Hence, the information indicates the determined set of beams. If the connection/radio link to the wireless device is lost (e.g. due to handover failure or a blocking obstacle), then the network can activate the back-up beam(s) (e.g. turn on synchronization/reference signal transmission, e.g. MRS(s) in the beam(s)) and the wireless device, which performs a default radio link re-establishment/recovery procedure, may find these beams when scanning. If the back-up beam is transmitted from another node than the serving beam, then the serving node, which detects the loss of connection/radio link to the wireless device requests the neighbor node (which is "responsible" for the back-up beam) to activate the back-up beam. Hence, the back-up beam may be found faster, than if they were not already identified. Furthermore, connection might already be prepared or already established in advance.

According to some aspects, the reporting S4 comprises reporting S4a information defining the first beam and/or S4b the at least one second beam. Hence, the wireless device reports preferred serving and/or back-up beams. Reporting typically implies that the wireless device sends or signals the information to the network. In one scenario, the wireless device is already connected to a serving beam, and then only suitable back-up beams are reported.

According to some aspects, the wireless device is configured to know which beam(s) the network has selected as back-up beam(s), so that the wireless device can search for this/these particular beam(s) when recovering from radio link loss. This may be before or after declaring radio link failure, depending on timer and/or threshold settings. The configuration may typically include indications of the reference signal(s). Examples of reference signal are e.g. Mobility Reference Signals, MRS(s) associated with the beam(s), but it may also include more information, e.g. timing information, that may facilitate for the wireless device to find the back-up beam(s). It would even be possible to configure the wireless device with radio resources for uplink and/or downlink transmission in a back-up beam, which would be used in case the back-up beam has to take over as the means of connectivity for the wireless device. Note that informing the wireless device a priori of the reference signal(s), e.g. MRS(s), of the back-up beam(s) means that the reference signal(s), e.g. MRS(s), of this/these beam(s) has/have to be reserved for as long as the back-up beam configuration is valid.

A corresponding method, performed in a network node in a wireless communication network for facilitating communication with a wireless device over a first beam, will now be described referring to FIG. 4. The method is performed either at connection setup handover, or when a wireless device is already connected to the network node. The network node is communicating with the wireless device using the first beam. Alternatively the first beam is a target beam in a handover of the wireless device. A target beam in handover, is the new serving beam that the network orders the wireless device to use in a handover. The network node is e.g. an access node. If beams are transmitted from multiple access points, the network node could be an access node with special coordination functionality, sometimes referred to as a cluster head or a Master eNodeB. The network node could be the source access node in a handover. The network node could also be another controlling entity.

The method comprises obtaining S11 information defining (or indicating) at least one second beam that satisfies a channel quality criterion and a spatial separation criterion with regard to the first beam. In other words, the network node obtains information about possible back-up beams of a serving beam or of a possible future serving beam, i.e. a target beam in a handover. The obtaining either comprises receiving the information from the wireless device or obtaining the information autonomously in the network node (or a combination thereof), as will be further described below.

According to some aspects, the second beam is a by the wireless device or by the network node preferred back-up beam of the first beam, as discussed above. Hence, the wireless device proposes a beam that might serve as a back-up if the present beam (or beams) fails.

Alternatively the network node itself calculates a beam that might serve as a back-up if the present beam fails. In connection with a handover, the network node calculates a back-up beam of the target beam, i.e. the new serving beam. Hence, according to some aspects, at handover, the network does not only inform the wireless device about a new serving beam, but also about one or more back-up beams of this beam.

Another possible scenario at handover, is that the network node calculates a set of e.g. three "good" beams fulfilling the spatial separation criterion and informs the target node and or wireless device about all the beams in the set, without any mutual priority.

The method further comprises initiating activation S14 of at least one of the second beams. If the network node is an access point and the back-up beam is also transmitted from the same network node, this step implies activating transmission of the at least one of the second beams from the network node. Note that in future communication systems one network node (or access node) might have different transmission points. Hence, moving from one transmission point to another does not necessarily imply a traditional handover.

Alternatively the network node instructs another (neighbor) network node to activate a back-up beam. This might be done via e.g. X2 signaling. In a handover situation this might be done at the handover, in connection with reporting the target beam. The back-up beam is then a back-up beam of the target beam.

According to some aspects, the back-up beam(s) is/are kept activated and the wireless device has parallel connections established over all beams, although data may not always be flowing on all the beams. In other words, the back-up beams could be activated in advance. This is useful for a wireless device running critical applications, which do not tolerate any interruption at all (or for which an interruption at a critical moment may be a severe problem) and/or which require a reliable data flow (which can be improved by sending multiple copies of the data across different beams) and/or which can make use of the increased data rates that parallel connections over multiple beams allow. In this case the notion of serving beam and back-up beam(s) in a sense loses its meaning, as the multiple beams are all serving the wireless device together and provide redundancy (i.e. back-up support) for each other in case of failure.

Alternatively, the back-up beams are activated at link failure. Stated differently, the method further comprises identifying S12 that the communication using the first beam is lost or that channel quality when using the first beam is below a threshold. Then, the activating S14 is initiated in response to the identifying.

As mentioned above the network node may obtain the information defining at least one second beam that satisfies a channel quality criterion and a spatial separation criterion with regards to the first beam in different ways.

In a first example embodiment the back-up beams are determined in the wireless device 10 and signaled to the network node 20, as described in connection to the method in a wireless device described in FIG. 3. Hence, according to some aspects, obtaining S11 comprises receiving S11b, from the wireless device, information defining the at least one second beam. This signaling might be in the form of a signature sequences identifying the beams. Those signature sequences have properties enabling the network to detect them without course synchronization.

Although identification of suitable back-up beams in the wireless device is efficient, it is disadvantageous in certain situations, which could be alleviated if the network had a more complete overview and control of the downlink beam reception situation at the wireless device. For example, letting the wireless device report suitable back-up beams in accordance with configured reporting conditions, makes it difficult for the network to take other considerations into account as flexibly as possible, e.g. in terms of the current load of the access node transmitting an identified suitable back-up beam. It is also potentially computationally demanding for the wireless device to determine the spatially separated beams. These disadvantages can be eliminated if the full responsibility of the selection process is moved to the network (e.g. the serving access node or a controlling entity, such as a cluster head or a Master eNodeB). This can be achieved by configuring the wireless device to report, not only all the downlink beams that satisfy a certain channel quality condition, but also indicate both the channel quality and the perceived angular direction (spatial separation) of each of these beams. The angular direction would e.g. be defined in terms of coordinates in a wireless device-fixed coordinate system (this would work since what is important for the network to know is the relative (i.e. not absolute) angular directions of the reported beams), e.g. the azimuthal angle and the polar angle of a spherical coordinate system.

Hence, in another example embodiment the wireless device signals information indicating channel quality and spatial separation of a plurality of candidate beams and the back-up beams are determined in the network. Then, the network node receives S10, from the wireless device, information indicating channel quality and spatial separation of a plurality of candidate beams. The information is typically based on measurements performed on a plurality of candidate downlink beams.

According to this example embodiment the obtaining S11 comprises identifying S11a the at least one second beam autonomously in the network node, based on the received information. The criterions for identification are same as for the wireless device. However, the network node might have additional parameters such as e.g. load that it might also take into account. This would herein be referred to as a network centric aspect, where the beams are identified in the network.

When the back-up beams are determined in the network, the wireless device typically needs to be informed about which beams are used as back-up beams, in order to facilitate switching to the back-up beam, when the current link fails. In other words, according to some aspects, the method comprises informing S13 the wireless device about the identified at least one second beam. In other words, the network node sends or transmits i.e. signals, the information to the wireless device.

Note that a difference between the network centric aspect and the wireless device assisted aspect is that the latter can be employed with either signature sequence based measurement reporting (where only the identities of the determined beams are signaled to the network) without requiring richer measurement reporting means such as Radio Resource Control, RRC, based measurement reporting. The network centric aspect though, only works with rich measurement reporting means, e.g. RRC based measurement reporting. Such reporting requires the wireless device to report additional parameters such as direction of arrival and channel quality.

Inclusion of spatial separation information such as Direction of Arrival, DoA, in measurement reports may be beneficial for other purposes than identification of suitable back-up beams and in other contexts than handover. For instance downlink beam DoA information gathered and reported by wireless devices may complement coverage information to facilitate good radio network planning (e.g. possibly in the form of a Self-Organizing Network, SON, function that automatically adapts the beamforming configurations of radio access nodes based on long-term observations and beam measurements while the network is in operation). SON refers to functions, where the network autonomously organizes itself or tunes or optimizes different aspects/parameters. This may refer to automatic discovery of neighbors and establishments of connections/interfaces in between, optimization of handover thresholds, antenna tilt angles etc.

Figure 5:
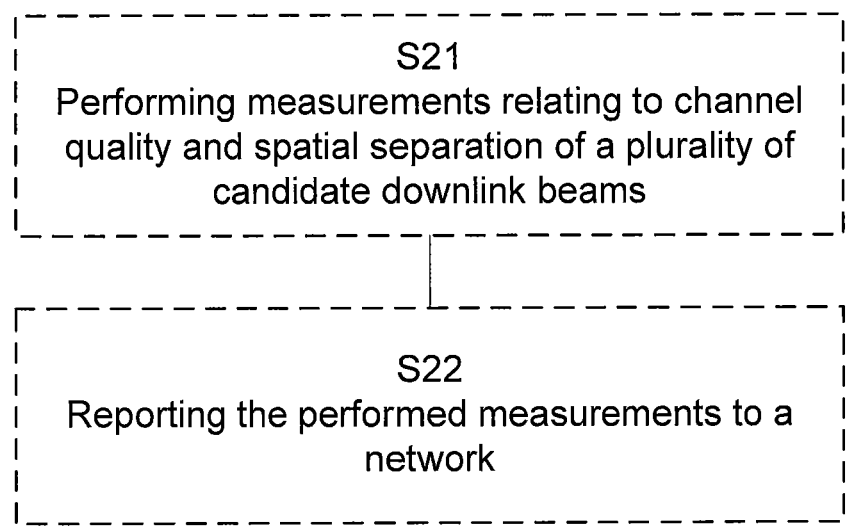
FIG. 5 is a flow chart that illustrates the method steps performed in a wireless device according to some aspects of the present disclosure.

Hence, according to some aspects the disclosure proposes a method for use in a wireless device, for facilitating communication with a network node, see FIG. 5. The method comprises performing S21 measurements relating to channel quality and spatial separation of a plurality of candidate downlink beams, and reporting S22 the performed measurements to a network node. This information enables the network node to allocate a first (serving) beam and also at least one second (back-up) beam as described above.

According to some aspects, the method then further comprises receiving information regarding activation of second back-up beam, from the network node. For examples the network node provides the identities of the first and the at least one second beams to the wireless device. By providing the wireless device with information about the back-up beam in advance, the wireless device might make a quicker switch to the back-up beam if the serving beam fails.

To address the above described problem it is proposed to identify suitable back-up beams which can ensure acceptable connectivity continuity in case a certain beam (e.g. the serving beam or the beam that initially was assessed to be the best) fails.

Backup beams are advantageous in many situations in a high frequency, beam based wireless communication network. They can be used in various ways to increase both reliability and performance.

As previously mentioned, back-up beams can advantageously be used in various ways to increase both reliability and performance. To this end, back-up beams may be used in different ways depending on the requirements of the wireless device or an application running on the wireless device.

In a first example, the wireless device identifies suitable back-up beam(s) (in accordance with configured measurement reporting conditions as described below) and reports to the network (e.g. an access node or a controlling entity, such as a cluster head or a Master eNB), where the identified suitable back-up beam(s) is/are recorded in the network. If the connection/radio link to the wireless device is lost (e.g. due to handover failure or a blocking obstacle), then the network can activate the back-up beam(s) (e.g. turn on synchronization/reference signal transmission, e.g. Mobility Reference Signal(s), MRS(s), in the beam(s)) and the wireless device, which performs a default radio link reestablishment/recovery procedure, may find these beams when scanning.

In one variation of the example above, the wireless device is configured to know which beam(s) the network has selected as back-up beam(s), so that the wireless device can search for this/these particular beam(s) when recovering from radio link loss (which may be before or after declaring radio link failure, depending on timer and/or threshold settings). The configuration may typically include indications of the reference signal(s) (e.g. MRS(s)) associated with the beam(s), but it may also include more information, e.g. timing information, that may facilitate for the wireless device to find the back-up beam(s). It would even be possible to configure the wireless device with radio resources for UL and/or DL transmission in a back-up beam, which would be used in case the back-up beam has to take over as the means of connectivity for the wireless device. Note that informing the wireless device a priori of the reference signal(s), e.g. MRS(s), of the back-up beam(s) means that the reference signal(s), e.g. MRS(s), of this/these beam(s) has/have to be reserved for as long as the back-up beam configuration is valid.

In a second example, the back-up beam(s) is/are kept activated in parallel with the serving beam, so that if the wireless device loses its radio link, it can quickly reestablish its connection on one of the back-up beam(s). Although this may be considered wasteful from a resource perspective (as radio resources are kept reserved but unused), it could be useful for a wireless device running (critical) applications which can only tolerate very brief interruptions.

In a third example, the back-up beam(s) is/are kept activated and the wireless device has connections established over all beams (although data may not always be flowing on all the beams). This is useful for a wireless device running critical applications, which do not tolerate any interruption at all (or for which an interruption at a critical moment may be a severe problem) and/or which require a reliable data flow (which can be improved by sending multiple copies of the data across different beams) and/or which can make use of the increased data rates that parallel connections over multiple beams allow. In this case the notion of serving beam and back-up beam(s) in a sense loses its meaning, as the multiple beams are all serving the wireless device together and provide redundancy (i.e. back-up support) for each other in case of failure.

Example Node Configuration

Figure 6:
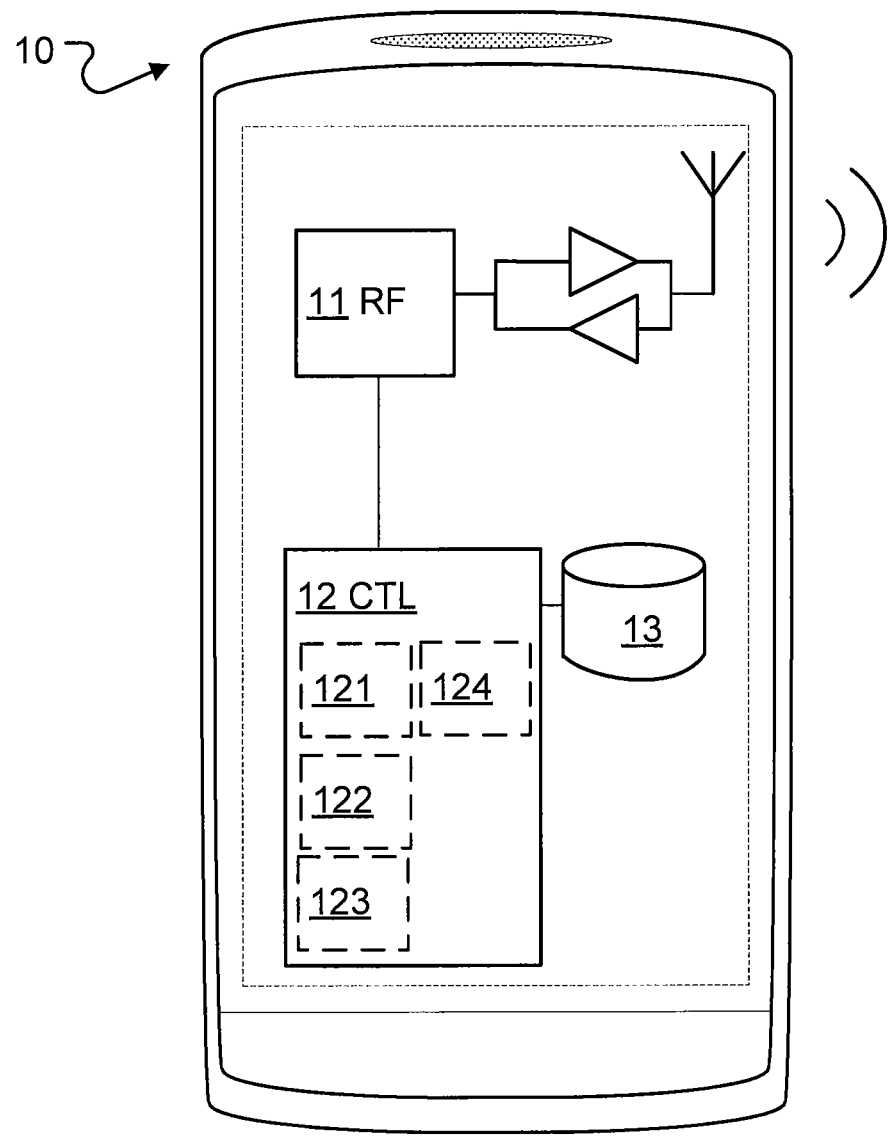
FIG. 6 is an example node configuration of a wireless device, according to some of the example embodiments.

Turning now to FIG. 6, a schematic diagram illustrating some modules of an example embodiment of a wireless device 10 being configured for facilitating communication with a network node, will now be briefly described. The wireless device 10 is configured to implement all aspects of the method described in relation to FIG. 3.

A "wireless device" as the term may be used herein, is to be broadly interpreted to include a radiotelephone having ability for Internet/Intranet access, web browser, organizer, calendar, a camera (e.g., video and/or still image camera), a sound recorder (e.g., a microphone), and/or Global Positioning System, GPS, receiver; a Personal Communications System, PCS, user equipment that according to some aspects combine a cellular radiotelephone with data processing; a Personal Digital Assistant, PDA, that can include a radiotelephone or wireless communication system; a laptop; a camera (e.g., video and/or still image camera) having communication ability; and any other computation or communication device capable of transceiving, such as a personal computer, a home entertainment system, a television, etc.

As shown in FIG. 6, the wireless device 10 comprises a radio communication interface or radio circuitry 11 configured to receive and transmit any form of communications or control signals within a network. It should be appreciated that the radio circuitry 11 is according to some aspects comprised as any number of transceiving, receiving, and/or transmitting units or circuitry. It should further be appreciated that the radio circuitry 11 is e.g. be in the form of any input/output communications port known in the art. The radio circuitry 11 e.g. comprises RF circuitry and baseband processing circuitry (not shown).

The wireless device 10 according to some aspects further comprises at least one memory unit or circuitry 13 that is in communication with the radio circuitry 11. The memory 13 is e.g. be configured to store received or transmitted data and/or executable program instructions. The memory 13 is e.g. configured to store any form of measurement data or spatial separation criterion. The memory 13 is e.g. be any suitable type of computer readable memory and is e.g. be of volatile and/or non-volatile type.

The wireless device 10 further comprises processing circuitry 12 which is configured to cause the wireless device to perform measurements relating to channel quality and spatial separation of a plurality of candidate downlink beams, to determine, based on the performed measurements, a set of downlink beams, such that each beam in the set of beams satisfies a channel quality criterion and a spatial separation criterion, and to report information defining the determined set of downlink beams to a network node.

The processing circuitry 12 is e.g. any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but is according to some aspects provided as any number of units or circuitry.

The controller, CTL, or processing circuitry 12 is e.g. constituted by any suitable type of computation unit, e.g. a microprocessor, Central Processing Unit, CPU, microcontroller, Digital Signal Processor, DSP, Field Programmable Gate Array, FPGA, or Application Specific Integrated Circuit, ASIC, or any other form of circuitry capable of executing computer program code. The computer program is e.g. stored in a memory, MEM, 13. The memory 13 can be any combination of a Random Access, RAM, and a Read Only Memory, ROM. The memory 13 in some situations also comprise persistent storage, which, for example, can be any single one or combination of magnetic memory, optical memory, or solid state memory or even remotely mounted memory. It should be appreciated that the processing circuitry need not be provided as a single unit but is according to some aspects provided as any number of units or circuitry. According to some aspects, the disclosure relates to a computer program comprising computer program code which, when executed, causes a wireless device to execute the methods described above and below.

According to some aspects, the processing circuitry 12 is configured to cause the wireless device to obtain the spatial separation criterion and/or the channel quality criterion.

According to some aspects, the processing circuitry 12 is configured to cause the wireless device to determine the set of downlink beams by identifying a first beam, wherein the first beam is a by the wireless device preferred serving beam for communication with the network node, and wherein the first beam is included in the determined set of downlink beams.

According to some aspects, the processing circuitry 12 is configured to cause the wireless device to determine the set of downlink beams by identifying at least one second beam, such that the at least one second beam fulfils at least one spatial separation criterion with regards to the first beam or with regards to a currently used serving beam, and wherein the second beam is included in the determined set of downlink beams.

According to some aspects, the second beam may be used as a back-up beam of a first beam being e.g. a preferred serving beam or of a currently used serving beam.

According to some aspects, the processing circuitry 12 is configured to cause the wireless device to report the set of downlink beams by reporting information defining the first beam and/or the at least one second beam.

According to some aspects, the processing circuitry 12 is configured to cause the wireless device to determine the set of downlink beams by evaluating an estimated direction of arrival of the plurality of candidate downlink beams.

According to some aspects, the processing circuitry 12 or the wireless device comprises modules configured to cause the wireless device to perform the methods described above. The modules are implemented in hardware or in software or in a combination thereof. The modules are according to one aspect implemented as a computer program stored in a memory 13 which run on the processing circuitry 12.

According to some aspects the wireless device 10 or the processing circuitry 12 comprises a performer 121 configured to cause the wireless device to perform measurements relating to channel quality and spatial separation of a plurality of candidate downlink beams.

According to some aspects the wireless device 10 or the processing circuitry 12 comprises an obtainer 122 configured to cause the wireless device to obtain a spatial separation criterion and/or a channel quality criterion.

According to some aspects the wireless device 10 or the processing circuitry 12 comprises a determiner 123 configured to cause the wireless device to determine, based on the performed measurements, a set of downlink beams, such that each beam in the set of beams satisfies a channel quality criterion and a spatial separation criterion.

According to some aspects the wireless device 10 or the processing circuitry 12 comprises a reporter 124 configured to cause the wireless device to report information defining the determined set of downlink beams to a network node.

In the alternative network centric implementation the processing circuitry 12 is instead configured to cause the wireless device to performing measurements relating to channel quality and spatial separation of a plurality of candidate downlink beams, and reporting the performed measurements to a network node. According to some aspects, the processing circuitry 12 is instead configured to cause the wireless device to receive information defining a first beam and one or more second beams.

Figure 7:
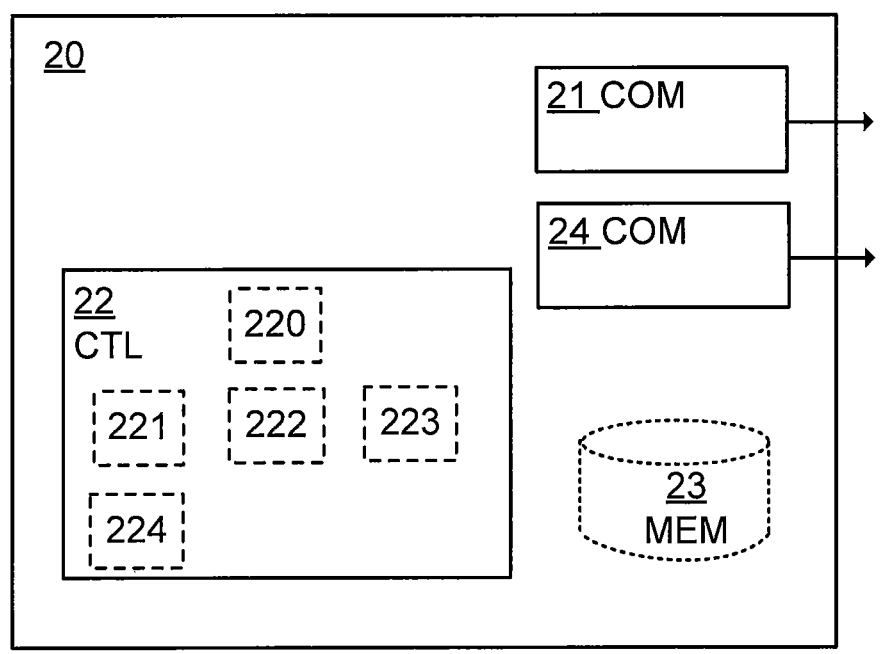
FIG. 7 is an example node configuration of a network node, according to some of the example embodiments.

Turning now to FIG. 7, a schematic diagram illustrating some modules of an example embodiment of a network node being configured for facilitating communication with a wireless device, wherein the network node is communicating with the wireless device using a first beam. The network node 20 is e.g. an access node such as an eNodeB in LTE. The network node could be an access node with special coordination functionality, sometimes referred to as a cluster head or a Master ENB. The network node could also be another controlling entity.

The network node 20 comprises a radio communication interface (i/f) 21 configured for communication with wireless devices 10. The wireless communication interface 21 is arranged for wireless communication with other network nodes within range of the network node 20. The radio communication interface 21 may be adapted to transmit data from several transmission points that are e.g. wirelessly connected to the network node 20. The radio communication interface 21 may be adapted to communicate over one or several radio access technologies. If several technologies are supported, the node typically comprises several communication interfaces, e.g. one WLAN or Bluetooth communication interface and one cellular communication interface.

As shown in FIG. 7, the network node 20 according to some aspects comprises a network communication interface 24. The network communication interface 24 is configured for communication with other network nodes e.g. in a core network. This communication is often wired e.g. using fiber. However, it may as well be wireless.

The network node 20 comprises a controller, CTL, or a processing circuitry 22 that may be constituted by any suitable Central Processing Unit, CPU, microcontroller, Digital Signal Processor, DSP, etc. capable of executing computer program code. The computer program may be stored in a memory, MEM 23. The memory 23 can be any combination of a Random Access, RAM, and a Read Only Memory, ROM. The memory 23 may also comprise persistent storage, which, for example, can be any single one or combination of magnetic memory, optical memory, or solid state memory or even remotely mounted memory. According to some aspects, the disclosure relates to a computer program comprising computer program code which, when executed, causes a wireless device to execute the methods described above and below. According to some aspects the disclosure pertains to a computer program product or a computer readable medium holding said computer program.

The processing circuitry 22 is configured to cause the network node 20 to obtain information defining at least one second beam that satisfies a channel quality criterion and a spatial separation criterion with regards to the first beam, and to initiate activation of at least one of the second beams.

According to some aspects, the second beam is a by the wireless device or by the network node preferred back-up beam of the first beam.

According to some aspects, the processing circuitry 22 is configured to cause the network node to identify that the communication using the first beam is lost or that channel quality when using the first beam is below a threshold; and to initiate the activation of at least one of the second beams in response to the identifying.

According to some aspects, the processing circuitry 22 is configured to cause the network node to receive, from the wireless device, information indicating channel quality and spatial separation of a plurality of candidate beams.

According to some aspects, the information is based on measurements performed on a plurality of candidate downlink beams.

According to some aspects, the processing circuitry 22 is configured to cause the network node to obtain the information defining the at least one second beam by identifying the at least one second beam autonomously in the network node, based on the received information.

According to some aspects, the processing circuitry 22 is configured to cause the network node to inform the wireless device about the identified at least one second beam.

According to some aspects, the processing circuitry 22 is configured to cause the network node to obtain the information defining the at least one second beam by receiving, from the wireless device, information defining the at least one second beam.

According to some aspects the processing circuitry 22 or the network node 20 comprises modules configured to perform the methods described above. The modules are implemented in hardware or in software or in a combination thereof. The modules are according to one aspect implemented as a computer program stored in a memory 23 which run on the processing circuitry 22.

According to some aspects the network node 20 or the processing circuitry 22 comprises a receiver 220 configured to cause the network node to receive, from the wireless device, information indicating channel quality and spatial separation of a plurality of candidate beams.

According to some aspects the network node 20 or the processing circuitry 22 comprises an obtainer 221 configured to cause the network node to obtain information defining at least one second beam that satisfies a channel quality criterion and a spatial separation criterion with regards to the first beam.

According to some aspects the network node 20 or the processing circuitry 22 comprises an identifier 222 configured to cause the network node to identify that the communication using the first beam is lost or that channel quality when using the first beam is below a threshold.

According to some aspects the network node 20 or the processing circuitry 22 comprises an informer 223 configured to cause the network node to inform the wireless device about the identified at least one second beam.

According to some aspects the network node 20 or the processing circuitry 22 comprises an initiator 224 configured to cause the network node to initiate activation of at least one of the second beams.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method for use in a wireless device, for facilitating communication with a network comprising a network node, the method comprising:
performing, by the wireless device, first measurements relating to channel quality and second measurements relating to spatial separation of a plurality of candidate downlink beams, at least one candidate downlink beam of the plurality of candidate downlink beams being received at the wireless device from the network node,
determining, by the wireless device, based on the performed measurements, a first set of qualified downlink beams, such that each qualified downlink beam in the first set of qualified downlink beams satisfies a channel quality criterion and a spatial separation criterion,
reporting, by the wireless device, information defining the first set of qualified downlink beams to the network node,
responsive to reporting the information defining the first set of qualified downlink beams, receiving, at the wireless device, a selection from the network node of a serving downlink beam,
determining, a second set of qualified downlink beams being from a second network node in the network that is separate from the network node,
identifying at least one second qualified downlink beam of the second set of qualified downlink beams such that the at least one second qualified downlink beam fulfills at least one spatial separation criterion with regards to the serving downlink beam, the at least one spatial separation criterion defining a threshold difference in direction of arrival between the at least one second qualified downlink beam and the serving downlink beam, the at least one second qualified downlink beam being usable as a back-up beam of the serving downlink beam, and
responsive to receiving the selection of the serving downlink beam and identifying the at least one second qualified downlink beam, using the serving downlink beam to receive a downlink communication from the network.

2. The method of claim 1, further comprising:
obtaining, by the wireless device, the spatial separation criterion and/or the channel quality criterion.

3. The method of claim 1, wherein determining the first set of qualified downlink beams comprises identifying a first qualified downlink beam, wherein the first qualified downlink beam is determined by the wireless device to be a preferred serving downlink beam for reception from the network node, and wherein the first downlink beam is included in the first set of qualified downlink beams.

4. The method of claim 3, wherein determining the first set of qualified downlink beams further comprises identifying at least one third qualified downlink beam, such that the at least one third qualified downlink beam fulfills at least one spatial separation criterion with regards to the first qualified downlink beam or with regards to a currently used serving downlink beam providing reception at the wireless device from the network node, wherein the at least one third qualified downlink beam is included in the first set of qualified downlink beams, and wherein the spatial separation criterion defines a threshold difference in direction of arrival between the at least one third qualified downlink beam and the first qualified downlink beam or between the at least one third qualified downlink beam and the currently used serving downlink beam.

5. The method of claim 4, wherein the at least one third qualified downlink beam is usable as a back-up beam of the first qualified downlink beam or of a currently used serving downlink beam.

6. The method of claim 4, wherein reporting the information comprises reporting information defining the first qualified downlink beam and/or the at least one third qualified downlink beam.

7. The method of claim 1, wherein determining the first set of qualified downlink beams comprises evaluating an estimated direction of arrival of each candidate downlink beam of the plurality of candidate downlink beams.

8. The method of claim 1, wherein the determining the first set of qualified downlink beams, further comprises identifying the first set of qualified downlink beams, such that each downlink beam in the first set of qualified downlink beams is spatially separate from other downlink beams in the first set of qualified downlink beams by at least a threshold value.

9. The method of claim 1, wherein the wireless device is a user device and the network node is a base station in a LTE telecommunications network.

10. The method of claim 1, further comprising:
responsive to receiving the selection of the serving downlink beam and identifying the at least one second downlink beam, establishing a communication link between the wireless device and the network node via the serving downlink beam;
detecting, by the wireless device after receiving the selection from the network node of the serving downlink beam and identifying the at least one second downlink beam, loss of the communication link between the wireless device and the network node via the serving downlink beam; and
responsive to detecting the communication link loss, establishing, by the wireless device, another communication link between the wireless device and the second network node via the back-up downlink beam.

11. The method of claim 1, wherein the network node comprises a base station.

12. The method of claim 1, wherein receiving, at the wireless device, the selection from the network node of the serving downlink beam comprises receiving, at the wireless device, a selection from the network node of the serving downlink beam and a back-up downlink beam from the first set of qualified downlink beams, and
wherein the selection of the back-up downlink beam is received before using the serving downlink beam.

13. A wireless device being configured for facilitating communication with a network comprising a plurality of network nodes, the wireless device comprising:
a radio communication interface for receiving downlink beams from the network node; and
processing circuitry configured to cause the wireless device to:
perform first measurements relating to channel quality and second measurements relating to spatial separation of a plurality of candidate downlink beams, at least one candidate downlink beam of the plurality of candidate downlink beams being received at the wireless device from a network node of the plurality of network nodes,
determine, based on the performed measurements, a first set of qualified downlink beams for receiving from the plurality of network nodes, such that each qualified downlink beam in the first set of qualified downlink beams satisfies a channel quality criterion and a spatial separation criterion, report information defining the first set of qualified downlink beams to the network node via the radio communication interface, receive, responsive to reporting the information defining the first set of qualified downlink beams, at the wireless device, a selection from the network node of a serving downlink beam from the first set of qualified downlink beams, determine, a second set of qualified downlink beams being from a second network node in the network that is separate from the network node;

identify at least one second qualified downlink beam of the second set of qualified downlink beams such that the at least one second qualified downlink beam fulfills at least one spatial separation criterion with regards to the serving downlink beam, the at least one spatial separation criterion defining a threshold difference in direction of arrival between the at least one second qualified downlink beam and the serving downlink beam, the at least one second qualified downlink beam being usable as a back-up beam of the serving downlink beam, and responsive to receiving the selection of the serving downlink beam and identifying the at least one second qualified downlink beam, use the serving downlink beam to receive a downlink communication from the network.

14. The wireless device of claim 13, wherein the processing circuitry is configured to cause the wireless device to obtain the spatial separation criterion and/or the channel quality criterion, and wherein the spatial separation criterion defines a threshold difference in direction of arrival between the first set of qualified downlink beams.

15. The wireless device of claim 13, wherein the processing circuitry is configured to cause the wireless device to determine the first set of qualified downlink beams by identifying a first qualified downlink beam, wherein the first qualified downlink beam is determined by the wireless device to be a preferred serving downlink beam for reception from the network node, and wherein the first qualified downlink beam is included in the first set of qualified downlink beams.

16. The wireless device of claim 15, wherein the processing circuitry is configured to cause the wireless device to determine the first set of qualified downlink beams by identifying the at least one second qualified downlink beam, such that the at least one second qualified downlink beam fulfils at least one spatial separation criterion with regards to the first qualified downlink beam, and wherein the at least one second qualified downlink beam is included in the first set of qualified downlink beams.

17. The wireless device of claim 16, wherein the processing circuitry is configured to cause the wireless device to report the first set of qualified downlink beams by reporting information defining the first qualified downlink beam and/or the at least one second qualified downlink beam.

18. The wireless device of claim 13, wherein the processing circuitry is configured to cause the wireless device to determine the first set of qualified downlink beams by evaluating an estimated direction of arrival of each candidate downlink beam of the plurality of candidate downlink beams.

19. The method of claim 13, wherein receiving, at the wireless device, the selection from the network node of the serving downlink beam comprises receiving, at the wireless device, a selection from the network node of the serving downlink beam and a back-up downlink beam from the first set of qualified downlink beams, and wherein the selection of the back-up downlink beam is received before using the serving downlink beam.

20. A method for use in a network node, for facilitating communication with a wireless device, wherein a first qualified downlink beam is a selected downlink beam designated for use in a handover of the wireless device from another network node to the network node, the method comprising:

obtaining, by the network node, information defining at least one second qualified downlink beam for transmitting from the network node to the wireless device, the at least one second qualified downlink beam satisfying a channel quality criterion and a spatial separation criterion with regard to the first qualified downlink beam, responsive to obtaining the information and prior to completing the handover of the wireless device to the network node, determining, by the network node, that a second qualified downlink beam of the at least one second qualified downlink beam is a preferred back-up downlink beam of the first qualified downlink beam, responsive to determining that the second qualified downlink beam of the at least one second qualified downlink beam is the preferred back-up downlink beam of the first qualified downlink beam, transmitting, by the network node to the wireless device, a selection of the second qualified downlink beam as a back-up downlink beam for the first qualified downlink beam, and responsive to transmitting the selection of the second qualified downlink beam, initiating, by the network node, activation of the first qualified downlink beam.

21. The method of claim 20, further comprising:

obtaining, by the wireless device, the spatial separation criterion and/or the channel quality criterion.

22. The method of claim 20, wherein determining the first set of qualified downlink beams comprises identifying a first qualified downlink beam, wherein the first qualified downlink beam is determined by the wireless device to be a preferred serving downlink beam for reception from the network node, and wherein the first downlink beam is included in the first set of qualified downlink beams.

23. The method of claim 20, wherein determining that the second qualified downlink beam of the at least one second qualified downlink beam is a preferred back-up downlink beam of the first qualified downlink beam comprises evaluating an estimated direction of arrival of the first qualified downlink beam and the second qualified downlink beam.

* * * * *